United States Patent
Shin et al.

(10) Patent No.: US 10,097,096 B2
(45) Date of Patent: Oct. 9, 2018

(54) PACKAGING OF A POWER CONVERSION CIRCUIT

(71) Applicant: TOYOTA MOTOR ENGINEERING & MANUFACTURING NORTH AMERICA, INC., Erlanger, KY (US)

(72) Inventors: Jongwon Shin, Ann Arbor, MI (US); Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 175 days.

(21) Appl. No.: 15/146,413

(22) Filed: May 4, 2016

(65) Prior Publication Data

US 2017/0324346 A1     Nov. 9, 2017

(51) Int. Cl.
*H02M 3/335*     (2006.01)
*H02J 7/00*      (2006.01)
*H02J 7/02*      (2016.01)

(52) U.S. Cl.
CPC ....... *H02M 3/33584* (2013.01); *H02J 7/0072* (2013.01); *H02J 7/025* (2013.01)

(58) Field of Classification Search
CPC ...... G06F 1/00; G06F 1/26; H02J 1/00; H02J 1/10; H02J 1/102; H02J 3/00; H02J 3/14;
(Continued)

(56) References Cited

U.S. PATENT DOCUMENTS

| 5,444,608 A | 8/1995 | Jain et al. |
| 6,031,726 A | 2/2000 | Vinciarelli et al. |

(Continued)

FOREIGN PATENT DOCUMENTS

WO     WO 2015/089279 A1     6/2015

OTHER PUBLICATIONS

Satoshi Sugahara, et al., "90% High Efficiency and 100-W/cm$^{5m3}$ High Power Density Integrated DC—DC Converter for Cellular Phones", IEEE Transactions on Power Electronics, vol. 28, Issue 4, Apr. 2013, pp. 1994-2004 (Abstract only).

(Continued)

*Primary Examiner* — Lincoln Donovan
*Assistant Examiner* — David Mattison
(74) *Attorney, Agent, or Firm* — Oblon, McClelland, Maier & Neustadt, L.L.P.

(57) ABSTRACT

A device includes a first circuit assembly with first circuitry configured on a first upper surface of a first circuit board that includes a first side of power conversion circuit. A first magnetic core is also configured on the first upper surface of the first circuit board. The device also includes a second circuit assembly with second circuitry configured on a second upper surface of a second circuit board that includes a second side of the power conversion circuit. A second magnetic core is also configured on the second upper surface of the second circuit board. The first circuitry of the first circuit assembly is connected to the second circuitry of the second circuit assembly to form the power conversion circuit via at least one of an electrical connection or a magnetic coupling between the first magnetic core and the second magnetic core.

20 Claims, 15 Drawing Sheets

(58) Field of Classification Search
CPC ............ H02J 7/00; H02J 7/0072; H02J 7/025; H02M 3/00; H02M 3/1584; H02M 3/33584
USPC .......................................................... 307/52
See application file for complete search history.

(56) References Cited

U.S. PATENT DOCUMENTS

| | | | |
|---|---|---|---|
| 6,356,448 B1 * | 3/2002 | DiBene, II | G06F 1/18 |
| | | | 174/252 |
| 7,236,086 B1 * | 6/2007 | Vinciarelli | H02M 3/33523 |
| | | | 340/12.32 |
| 7,248,483 B2 | 7/2007 | West | |
| 7,706,154 B2 | 4/2010 | Chen et al. | |
| 8,867,250 B2 | 10/2014 | Hua | |
| 9,748,774 B2 * | 8/2017 | Van Den Brink | H02J 5/005 |
| 2009/0225569 A1 | 9/2009 | Begalke | |
| 2012/0140529 A1 | 6/2012 | Jin et al. | |
| 2012/0163035 A1 | 6/2012 | Song et al. | |
| 2013/0121038 A1 | 5/2013 | Ryu et al. | |
| 2014/0153197 A1 | 6/2014 | Yen | |
| 2014/0211521 A1 | 7/2014 | Mazumder | |
| 2014/0254211 A1 * | 9/2014 | Luo | H02M 3/33523 |
| | | | 363/21.15 |
| 2015/0043251 A1 | 2/2015 | Hasegawa | |
| 2015/0102798 A1 | 4/2015 | Giuliano | |
| 2015/0194898 A1 | 7/2015 | Shinohara et al. | |
| 2015/0326105 A1 | 11/2015 | Pan et al. | |
| 2016/0111203 A1 * | 4/2016 | Yamamoto | H01F 37/00 |
| | | | 363/131 |

OTHER PUBLICATIONS

Jona-Won Shin, et al., "DBC Switch Module for Management of Temperature and Noise in 220-W/in$^3$ Power Assembly", IEEE Transactions on Power Electronics, vol. 31, Issue 3, Mar. 2016, pp. 2387-2394 (Abstract only).

* cited by examiner

PACKAGING OF A POWER CONVERSION CIRCUIT

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014.

BACKGROUND

Power conversion circuits are typically packaged together in a single circuit assembly that has static magnetic properties and is completely replaced when component failure occurs. In addition, volume and power density are properties of electronic circuits have become increasingly important as size of electronic devices has been reduced. U.S. Pat. No. 7,236,086 to Vinciarelli et al. describes a power conversion apparatus with primary and secondary circuit assemblies that are enclosed in mechanically separate protective housings and are magnetically coupled via transformer windings installed in each of the protective housings.

SUMMARY

In an exemplary implementation, a device includes a first circuit assembly with first circuitry configured on a first upper surface of a first circuit board that includes a first side of power conversion circuit. A first magnetic core is also configured on the first upper surface of the first circuit board. The device also includes a second circuit assembly with second circuitry configured on a second upper surface of a second circuit board that includes a second side of the power conversion circuit. A second magnetic core is also configured on the second upper surface of the second circuit board. The first circuitry of the first circuit assembly is connected to the second circuitry of the second circuit assembly to form the power conversion circuit via at least one of an electrical connection or a magnetic coupling between the first magnetic core and the second magnetic core.

The first circuit assembly and the second circuit assembly can have corresponding structures and configurations.

A first lower surface of the first circuit assembly can face a second lower surface of the second circuit assembly when the first circuitry of the first circuit assembly is connected to the second circuitry of the second circuit assembly.

A total length of the device can correspond to the first length of the first circuit board or the second length of the second circuit board, and the first length of the first circuit board can be equal to a second length of the second circuit board.

A first height of the first circuit assembly can correspond to a first thickness of the first circuit board plus a second thickness of the first circuitry or the first magnetic core configured on the first upper surface of the first circuit board. A second height of the second circuit assembly can correspond to a third thickness of the second circuit board plus a fourth thickness of the second circuitry and second first magnetic core configured on the second upper surface of the second circuit board. The total height of the device can correspond to the first height of the first circuit assembly plus the second height of the second circuit assembly plus a predetermined distance between the first magnetic core and the second magnetic core. The first height of the first circuit assembly can be equal to the second height of the second circuit assembly.

The first circuitry can include a first switch and a first capacitor, and the second circuitry can include a second switch and a second capacitor. The first circuitry can be electrically connected to the second circuitry via the first capacitor and the second capacitor cross-connected across the first magnetic core and the second magnetic core.

The first circuitry and the second circuitry can be symmetric across the first magnetic core and the second magnetic core.

The power conversion circuit can be configured to perform bi-directional power transfer.

A distance between the first magnetic core and the second magnetic core when the first circuitry is connected to the second circuitry can be based on one or more predetermined coupling characteristics of the power conversion circuit. The one or more predetermined coupling characteristics can include an amount of magnetizing inductance or a coupling coefficient.

A distance between the first magnetic core and the second magnetic core when the first circuitry is connected to the second circuitry can be based on a predetermined amount of leakage inductance of the power conversion circuit.

The first circuit assembly can be mechanically connected to the second circuit assembly via one or more screws where a number of screw pitches between the first circuit assembly and the second circuit assembly correspond to a gap distance between the first magnetic core and the second magnetic core.

The first circuit assembly can be mechanically connected to the second circuit assembly via one or more clips with a non-conducting material between the first circuit assembly and the second circuit assembly having a thickness that corresponds to a gap distance between the first magnetic core and the second magnetic core.

In a further exemplary implementation, a process can include configuring first circuitry including a first side of power conversion circuit and a first magnetic core on a first circuit board to form a first circuit assembly; configuring second circuitry including a second side of the power conversion circuit and a second magnetic core on a second circuit board to form a second circuit assembly; establishing a magnetic connection between the first circuitry of the first circuit assembly and the second circuitry of the second circuit assembly based on a predetermined distance between the first magnetic core and the second magnetic core; and establishing an electrical connection between the first circuitry of the first circuit assembly and the second circuitry of the second circuit assembly via at least one electrical connection.

An amount of magnetic coupling or an amount of leakage inductance between the first magnetic core and the second magnetic core can by modified by modifying the distance between the first circuit assembly and the second circuit assembly.

The process can further include detecting at least one failed component of the power conversion circuit; disconnecting the first circuitry of the first circuit assembly from the second circuitry of the second circuit assembly; and replacing the first circuit assembly or the second circuit assembly based on a location of the at least one failed component.

In a further exemplary implementation, a circuit assembly can include circuitry configured on an upper surface of a circuit board including a half of a power conversion circuit and a magnetic core configured on the upper surface of the circuit board. The circuitry can be configured to connect to the circuitry of another circuit assembly to form the power conversion circuit via at least one of an electrical connection or a magnetic coupling between the magnetic core and another magnetic core of the another circuit assembly.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
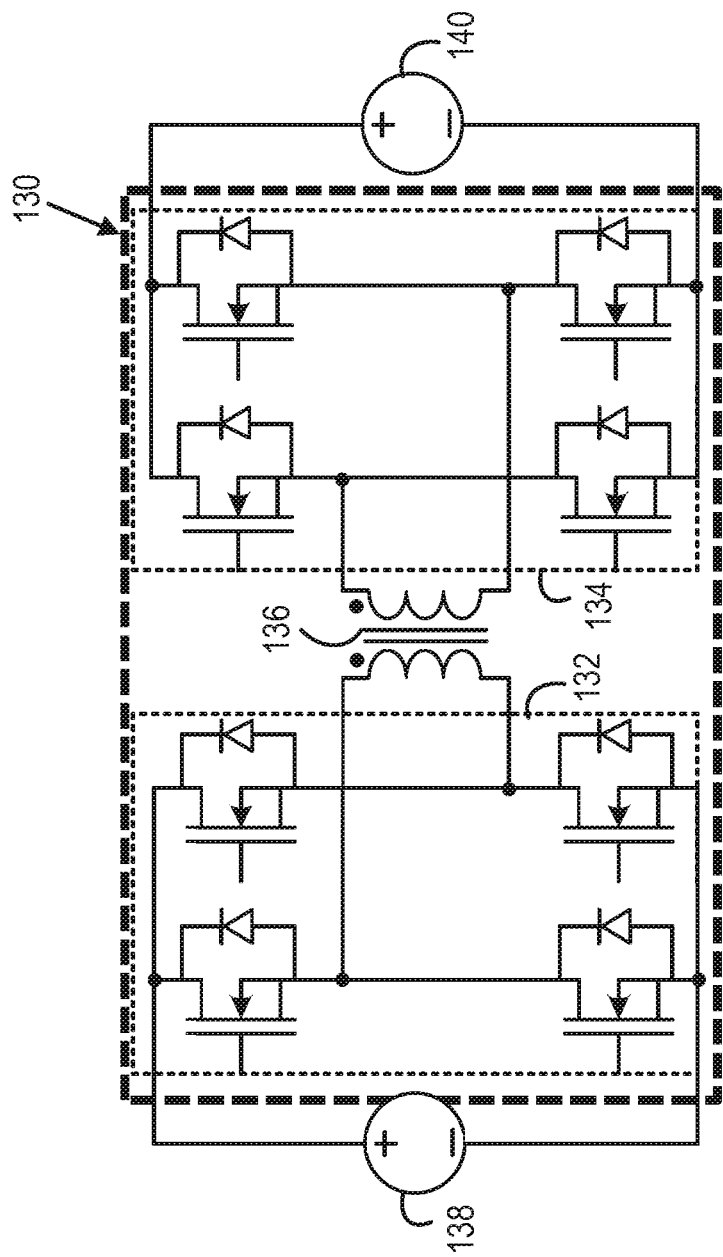
FIG. 1 is an exemplary diagram of conventional packaging assembly for a power conversion circuit.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary diagram of conventional circuit packaging assembly 130, for a power conversion circuit, such as a DC-DC dual-active-bridge (DAB) converter circuit. For example, the circuit packaging assembly 130 can include power conversion circuitry such as a set of primary switches 132, a set of secondary switches 134, a magnetic core transformer 136, and other circuit components mounted on a printed circuit board (PCB). In addition, a primary power source and/or sink 138 and a secondary power source and/or sink 140 can be connected to the circuitry associated with the circuit packaging assembly 130. In some implementations, a height of the transformer 136 affects an overall height of the circuit packaging assembly 130, which can increase a total circuit volume and reduce density of the circuit packaging assembly 130. Also, magnetic properties of the power conversion circuitry, such as a coupling coefficient, amount of magnetizing inductance, or amount of leakage inductance, are fixed values that cannot be modified once the circuit packaging assembly 130 is constructed. In addition, failure of one component of the power conversion circuit installed on the circuit packaging assembly 130 may cause the entire circuit packaging assembly 130 to be replaced, which can result in increased maintenance costs.

Figure 2:
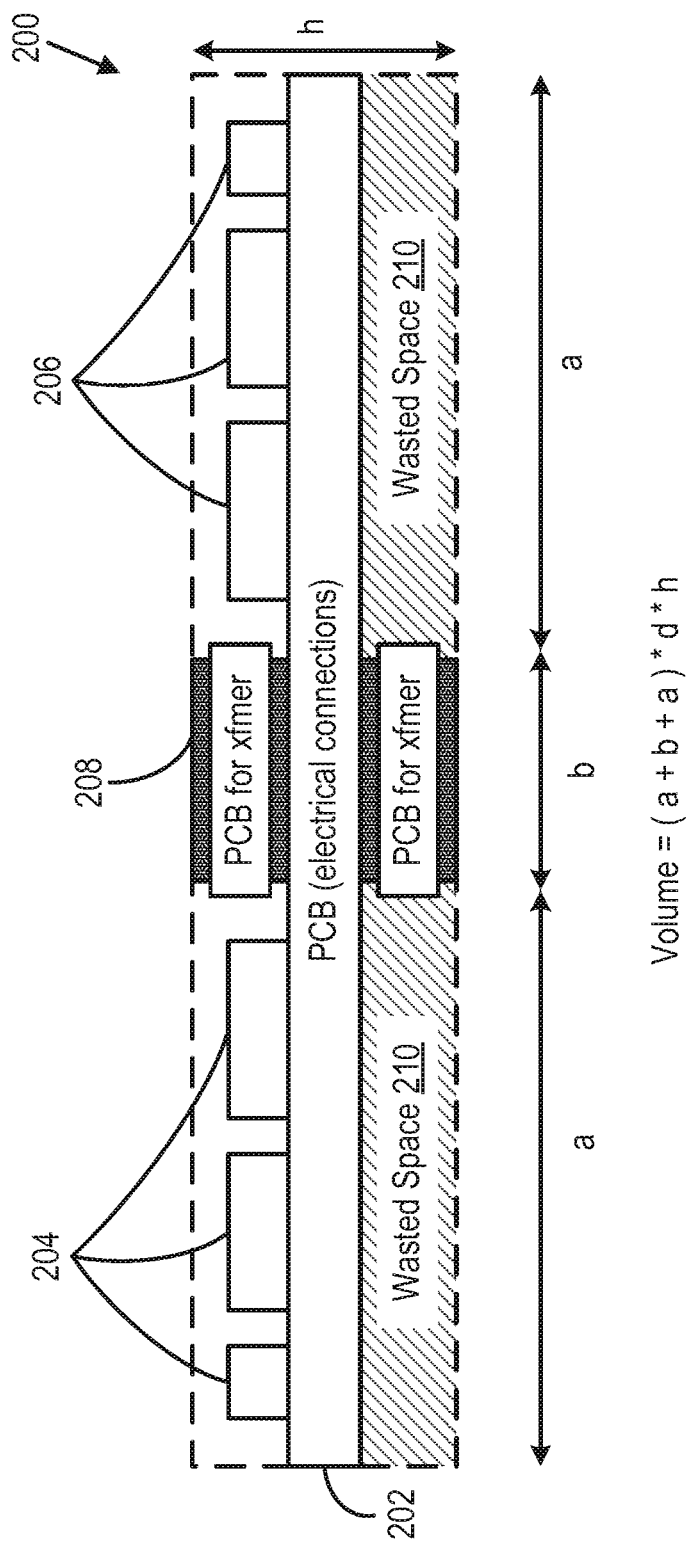
FIG. 2 is an exemplary side view of a conventional packaging assembly for a power conversion circuit.

FIG. 2 is an exemplary side view 200 of a power conversion circuit mounted on a circuit board, such as the conventional packaging assembly 130. For example, primary circuit components 204 and secondary circuit components 206 can be mounted to an upper surface of PCB 202. The primary circuit components 204 and secondary circuit components 206 can include switches, diodes, wire connections, and other electrical components associated with a power conversion circuit. In addition, the power conversion circuit can also include a magnetic core transformer 208 that is connected to the PCB 202 and also includes an additional PCBs associated with primary and secondary windings of the magnetic core transformer 208. In some implementations, a total height h of the circuit packaging assembly 130 corresponds to a height of the magnetic core transformer 208. Because the height of the magnetic core transformer 208 extends above the upper surface of PCB 202 and below a lower surface of the PCB 202, the circuit packaging assembly 130 includes areas of wasted space 210 below the lower surface of the PCB 202. In addition, once the magnetic core transformer 208 is configured on the PCB 202, the magnetic properties of the power conversion circuit 100 cannot be changed.

In some implementations, a total length of the circuit packaging assembly 130 is equal to a length a of the primary circuit components 204 plus length b of the magnetic core transformer 208 plus length a of the secondary circuit components 206. In one implementation, the lengths a of the primary circuit components 204 and the secondary circuit components 206 are equal, but in other implementations, the lengths of the primary circuit components 204 and the secondary circuit components may be unequal. In addition, the circuit packaging assembly 130 can have a depth d that can correspond to a width of the PCB 202. The volume of the circuit packaging assembly 130 can be described by Equation (1).

$$\text{Volume} = (a+b+a)*d*h \tag{1}$$

The wasted space 210 in the circuit packaging assembly 130 results in an increased circuit volume and a reduced power density of the circuit packaging assembly 130. For example, conventional circuit packaging assemblies can typically have power densities of approximately 10 to 15 Watts/cubic centimeter (W/cc) and volumes of approximately 40 cc.

Figure 3A:
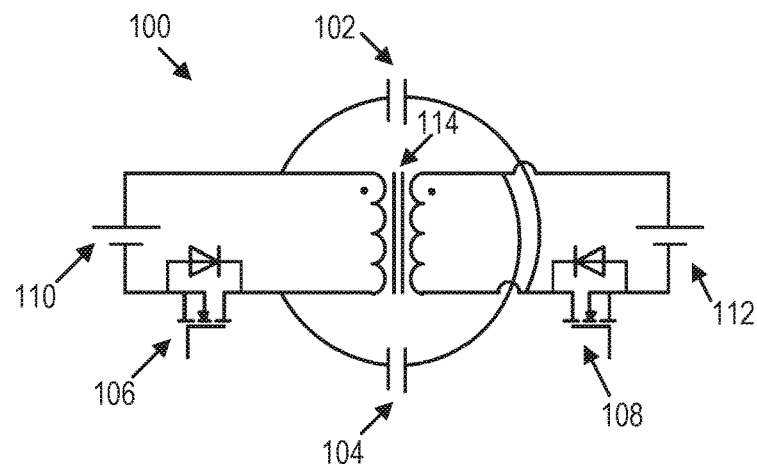
FIG. 3A is an exemplary schematic diagram of a DC-DC power conversion circuit.

FIG. 3A is an exemplary illustration of an isolated DC-DC power conversion circuit 100. The DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power source 110, and the secondary side can include a secondary switch 108 and a secondary DC power source 112. The primary DC power source 110 and the secondary DC power source 112 can function as either a power source or a power sink depending on the direction of power transfer through the DC-DC power conversion circuit 100. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power source 110 to the voltage of the secondary DC power source 112.

In certain implementations, the DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In addition, the switch on the side of the DC-DC power conversion circuit 100 that is receiving power can function as a synchronous rectifier to reduce circuit losses. For example, when power is transferred from the primary side to the secondary side of the DC-DC power conversion circuit 100 by cycling the primary switch 106 on and off, the secondary switch 108 can be the synchronous rectifier that is turned on and off at predetermined time intervals to provide a current path through the secondary switch 108 rather than through the parallel-connected diode. In some implementations, the primary switch 106 and secondary switch 108 are controlled by gate drivers that are integrated into the primary switch 106 and the secondary switch 108.

In some implementations, the DC-DC power conversion circuit 100 can also include sensors obtain sensor data from the components of the circuit, such as current sensors, voltage sensors, temperature sensors, and the like. For example, voltage sensors can measure voltage across the primary switch 106 or secondary switch 108 and can transmit the sensor data to a controller via a wired or wireless connection. The controller can control operations and detect failures of the DC-DC power conversion circuit 100 based on the received sensor data.

Figure 3B:
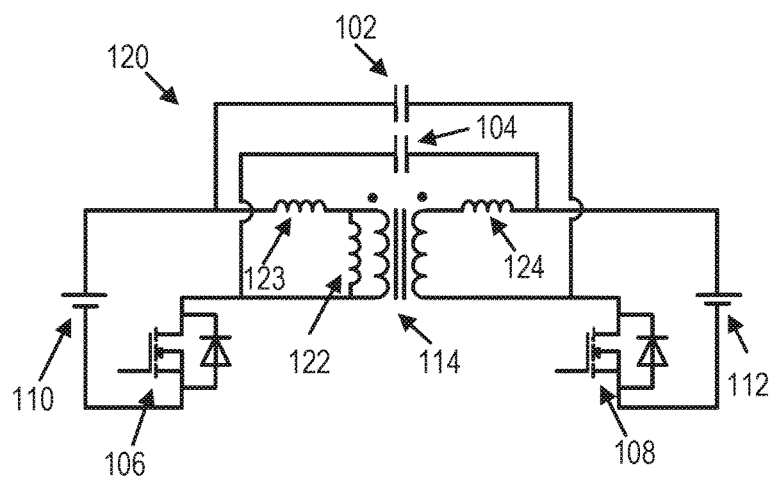
FIG. 3B is an exemplary schematic diagram of a DC-DC power conversion circuit.

FIG. 3B is another exemplary schematic diagram of an isolated DC-DC power conversion circuit 120. In addition to the components described with respect to the DC-DC power conversion circuit 100 of FIG. 1A, the DC-DC power conversion circuit 120 can also include an excitation inductor 122 and leakage inductors 123 and 124. In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the excitation inductor 122 and/or the leakage inductors 123 and 124 can illustrate an equivalent circuit for a real transformer. The excitation inductor 122 can be added in parallel with the primary side of the magnetic core transformer 114 in order to account for non-zero reluctance within the magnetic core transformer 114. In addition, the leakage inductors 123 and 124 can demonstrate how imperfect coupling within the magnetic core transformer 114 can affect the functionality of the DC-DC power conversion circuit 120. In order to provide a more concise description, the isolated DC-DC power conversion circuit 100 and 120 can be used interchangeably throughout the disclosure.

Figure 3C:
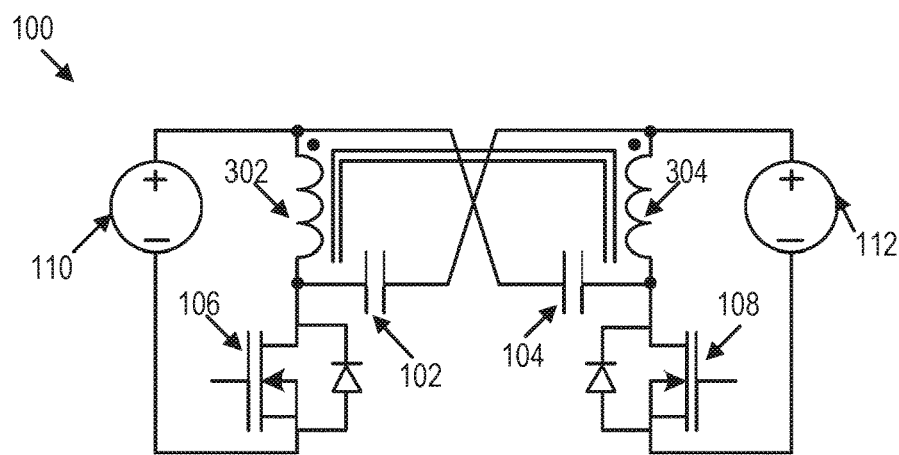
FIG. 3C is an exemplary schematic diagram of a DC-DC power conversion circuit.

FIG. 3C is an exemplary schematic diagram of another representation of the DC-DC power conversion circuit 100. The schematic diagram shown in FIG. 3C includes all of the circuit components described with respect to FIG. 3A, but the magnetic core transformer 114 is represented by separated magnetic cores on each side of the DC-DC power conversion circuit 100, and all of the circuit components are shown as being associated with either the primary side or the secondary side of the DC-DC power conversion circuit 100. For example, magnetic core 302 is on the primary side and magnetic core 304 is on the secondary side of the DC-DC power conversion circuit 100. In addition, the capacitor 102 is associated with the primary side and the capacitor 104 is associated with the secondary side of the DC-DC power conversion circuit 100. In some implementations, the primary and secondary sides of the DC-DC power conversion circuit 100 can have identical circuit structures and configurations.

Figure 4:
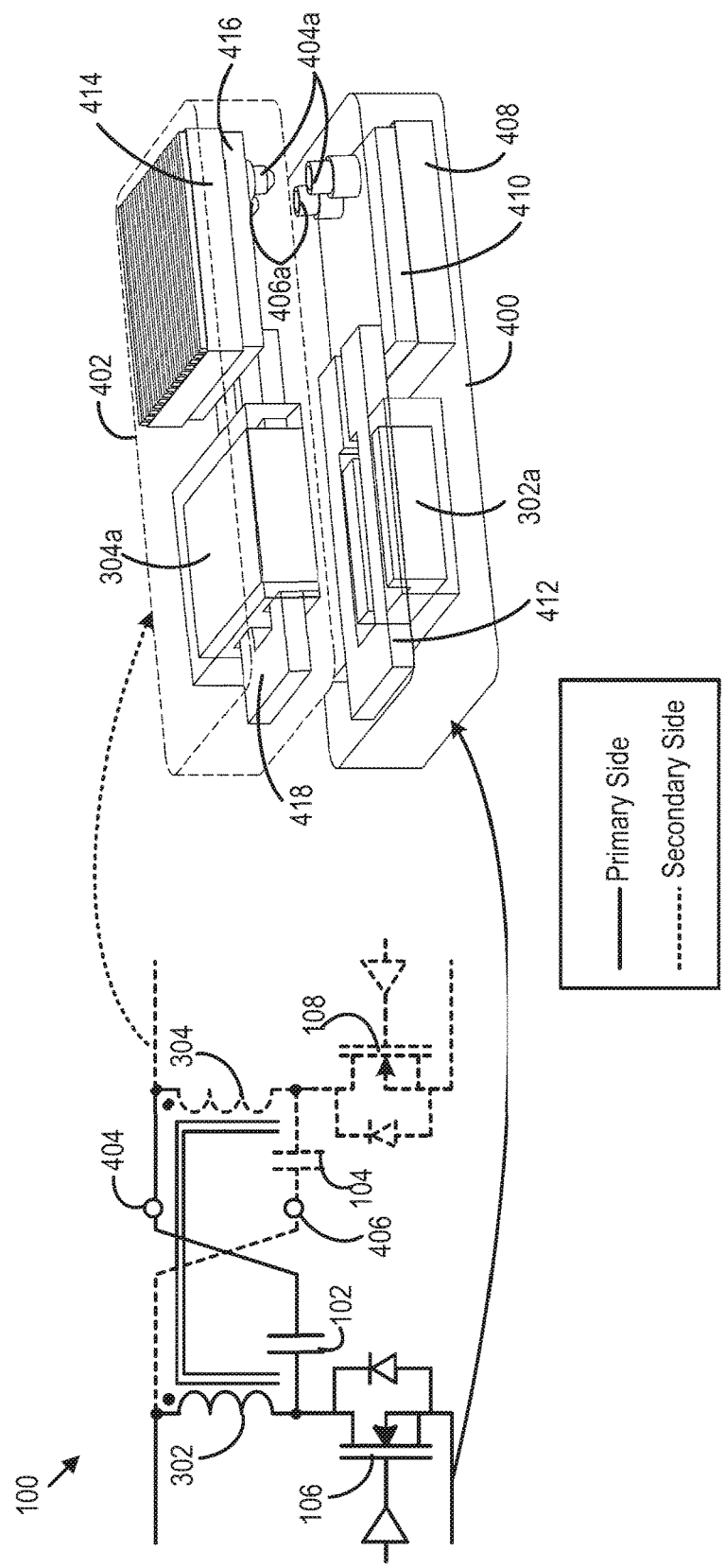
FIG. 4 is an exemplary illustration of a DC-DC power conversion circuit with associated split packaging assemblies.

FIG. 4 is an exemplary illustration of the DC-DC power conversion circuit 100 with associated split circuit packaging assemblies 400 and 402. Throughout the disclosure, the circuit packaging assemblies 400 and 402 can be interchangeably referred to as half-circuit assemblies 400 and 402 or primary circuit assembly 400 and secondary circuit assembly 402. In addition to the components described with respect to FIG. 3C, the DC-DC power conversion circuit 100 shown in FIG. 4 also includes a primary electrical connection 404 in a first cross-connection path with the capacitor 102 and a secondary electrical connection 406 in a second cross-connection path with the capacitor 104.

For example, primary circuit assembly 400 can include primary side electrical components 408 configured on a PCB 410 that include primary side circuitry of the DC-DC power conversion circuit 100 such as the primary switch 106 with the parallel-connected diode, capacitor 102, and other associated components, wiring, and the like. The primary circuit assembly 400 can also include magnetic core 302a mounted on PCB 412 that corresponds to the magnetic core 302 from the schematic diagram of the DC-DC power conversion circuit 100, which represents a primary side of the transformer 114. In some implementations, the PCB 410 and PCB 412 can be one PCB on which the primary side electrical components 408 and the magnetic core 302a are configured.

Secondary circuit assembly 402 can include secondary side electrical components 414 configured on a PCB 416 that include secondary side circuitry of the DC-DC power conversion circuit 100 such as the secondary switch 108 with the parallel-connected diode, capacitor 104, and other associated components, wiring, and the like. The secondary circuit assembly 402 can also include magnetic core 304a mounted on PCB 418 that corresponds to the magnetic core 304 from the schematic diagram of the DC-DC power conversion circuit 100, which represents a secondary side of the transformer 114. In some implementations, the PCB 416 and PCB 418 can be one PCB on which the secondary side electrical components 414 and the magnetic core 304a are configured.

The primary circuit assembly 400 and the secondary circuit assembly 402 can be connected in order to form the DC-DC power conversion circuit 100. For example, the primary circuit assembly 400 and the secondary circuit assembly 402 can include a primary electrical connector 404a and a secondary electrical connector 406a that correspond to the primary electrical connection 404 and the secondary electrical connection 406. In some implementations, the primary circuit assembly 400 is connected to the secondary circuit assembly 402 by connecting the primary electrical connector 404a from the primary circuit assembly 400 to the primary electrical connector 404a from the secondary circuit assembly 402 and connecting the secondary electrical connector 406a from the primary circuit assembly 400 to the secondary electrical connector 406a from the secondary circuit assembly 402. In addition, when the primary circuit assembly 400 is connected to the secondary circuit assembly 402, a lower surface of the PCBs 410 and 412 face a lower surface of the PCBs 416 and 418.

The primary circuit assembly 400 can also be connected to the secondary circuit assembly 402 via magnetic coupling that occurs between the magnetic cores 302a and 304a. In some implementations, transformer properties of the DC-DC power conversion circuit 100, such as magnetizing inductance, coupling coefficient, or leakage inductance are based on a distance of a gap between the magnetic core 302a and the magnetic core 304a. Because the magnetic core 302a and magnetic core 304a are housed in physically distinct circuit assemblies, the transformer properties of the DC-DC power conversion circuit 100 can be modified by increasing or decreasing the distance of a gap between the primary circuit assembly 400 and the secondary circuit assembly 402. References throughout the disclosure to the gap distance between the magnetic cores 302a and 304a and between the primary circuit assembly 400 and the secondary circuit assembly 402 can be used interchangeably. Being able to modify the transformer properties can provide greater flexibility to modify operational characteristics of the DC-DC power conversion circuit 100 after the primary circuit assembly 400 and the secondary circuit assembly 402 are constructed.

In some implementations, the primary circuit assembly 400 and the secondary circuit assembly 402 can have identical dimensions, circuit components, and structures so that the DC-DC power conversion circuit 100 can be constructed of two of the primary circuit assemblies 400 or two of the secondary circuit assemblies 402. In addition, because the primary circuit assembly 400 and the secondary circuit assembly 402 include only half of the DC-DC power conversion circuit 100, an overall circuit complexity is reduced when compared to the conventional circuit packaging assembly 130, which provides greater manufacturing efficiency.

Also, implementing the DC-DC power conversion circuit 100 by connecting the primary circuit assembly 400 to the secondary circuit assembly 402 can reduce maintenance costs. For example, when a failed component of the DC-DC power conversion circuit 100 is detected, the primary electrical connectors 404a and the secondary electrical connectors 406a on the primary circuit assembly 400 and the secondary circuit assembly 402 can be disconnected, and either the primary circuit assembly 400 or the secondary circuit assembly 402 is replaced based on a location of the failed component without having to replace a circuit packaging assembly that includes an entire power conversion circuit. For example, if one of the primary electrical components 408 or the magnetic core 302a fails, then the primary circuit assembly 400 can be replaced. In addition, if one of the secondary electrical components 414 or the magnetic core 304a fails, the secondary circuit assembly 402 can be replaced.

Figure 5:
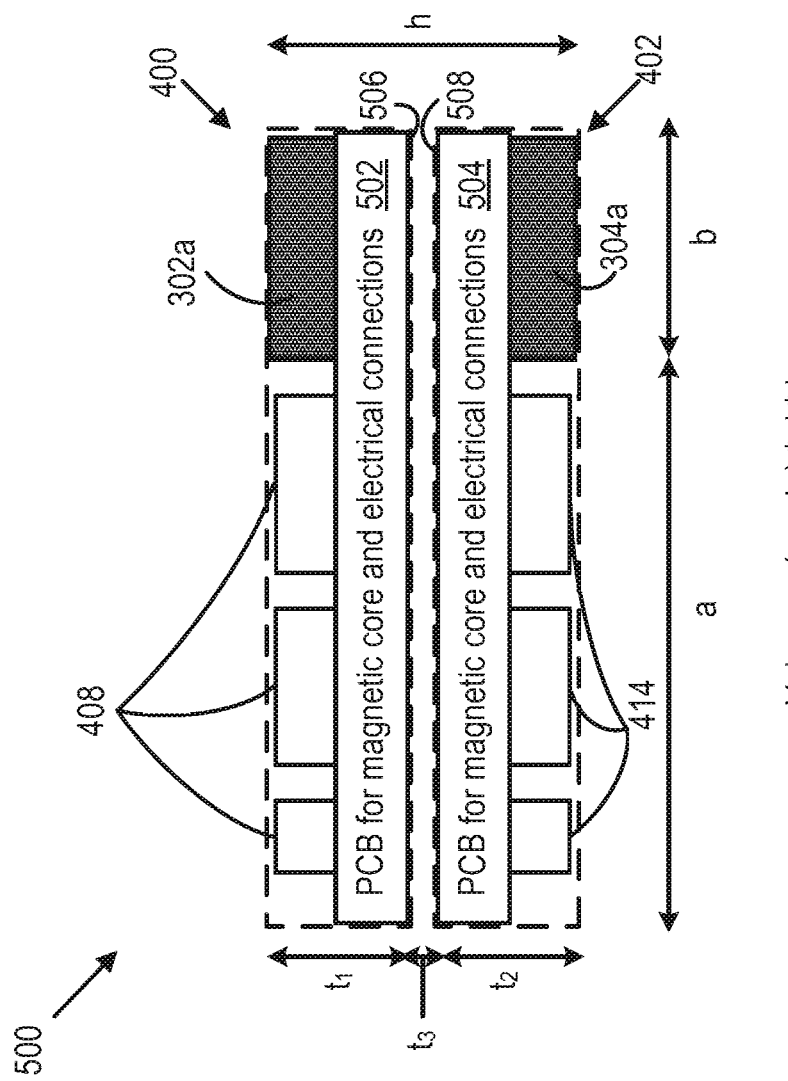
FIG. 5 is an exemplary side view of a split circuit packaging assembly for a power conversion circuit.

FIG. 5 is an exemplary side view of circuit packaging assemblies 500 for a power conversion circuit, such as the DC-DC power conversion circuit 100. In some implementations, the circuit packaging assemblies can be the primary circuit assembly 400 and the secondary circuit assembly 402 that include the primary side and secondary side circuit components of the DC-DC power conversion circuit 100, respectively. With respect to the primary circuit assembly 400, the primary electrical components 408 can be mounted to an upper surface of PCB 502 which can include either one or both of the PCBs 410 and 412. In addition, the primary circuit assembly 400 can also include the magnetic core 302a that is configured on the PCB 502. In some implementations, a height $t_1$ of the primary circuit assembly 400 corresponds to a thickness of the PCB 502 plus a thickness of the primary side electrical components 408 or the magnetic core 302a configured on the upper surface of the PCB 502. For example, if the thickness of the magnetic core 302a is greater than the thickness of the primary electrical components 408, then the height $t_1$ of the primary circuit assembly 400 corresponds to the thickness of the PCB 502 plus the thickness of the magnetic core 302a.

Likewise, for the secondary circuit assembly 402, the secondary electrical components 414 can be mounted to an upper surface of PCB 504 which can include either one or both of the PCBs 416 and 418. In addition, the secondary circuit assembly 402 can also include the magnetic core 304a that is configured on the PCB 504. In some implementations, a height $t_2$ of the secondary circuit assembly 402 corresponds to a thickness of the PCB 504 plus a thickness of the secondary side electrical components 414 or the magnetic core 304a configured on the upper surface of the PCB 504. For example, if the thickness of the magnetic core 304a is greater than the thickness of the secondary electrical components 414, then the height $t_2$ of the secondary circuit assembly 402 corresponds to the thickness of the PCB 504 plus the thickness of the magnetic core 304a.

In some implementations, a total height h of the circuit packaging assemblies 500 for DC-DC power conversion circuit 100 corresponds to the height of the primary circuit assembly $t_1$ plus the height of the secondary circuit assembly $t_2$ plus a predetermined distance $t_3$ between the primary circuit assembly 400 and the secondary circuit assembly 402 that produces a predetermined distance between the magnetic core 302a and the magnetic core 304a. The predetermined distance between the magnetic core 302a and the magnetic core 304a corresponds to the predetermined transformer properties of the DC-DC power conversion circuit 100.

In some implementations, a total length of the circuit packaging assemblies 500 that form the DC-DC power conversion circuit 100 corresponds to a length a of the primary electrical components 408 or the secondary electrical components 414 plus length b of the magnetic core 302a or magnetic core 304b. For example, the lengths a of the primary electrical components 408 and the secondary electrical components 414 can be approximately equal and the lengths b of the magnetic core 302a and magnetic core transformer 304a can be approximately equal. Also, a lower surface 506 of the primary circuit assembly 400 faces a lower surface 508 of the secondary circuit assembly 402 when the primary components of the primary circuit assembly 400 are connected to the secondary components of the secondary circuit assembly 402. Therefore, the total length of the connected circuit packaging assemblies 500 is corresponds to the length of the primary circuit assembly 400 or the secondary circuit assembly 402. Stated another way, the total length of the connected circuit packaging assemblies corresponds to a length of the PCB 502 or the PCB 504 on which the circuit components and magnetic cores are mounted. In addition, the connected circuit assemblies 500 of the DC-DC power conversion circuit 500 can have a depth d that can correspond to a width of the PCB 502 or the PCB 504. The volume of the connected circuit assemblies 500 can be described by Equation (2).

$$\text{Volume} = (a+b)*d*h \qquad (2)$$

Figure 6:
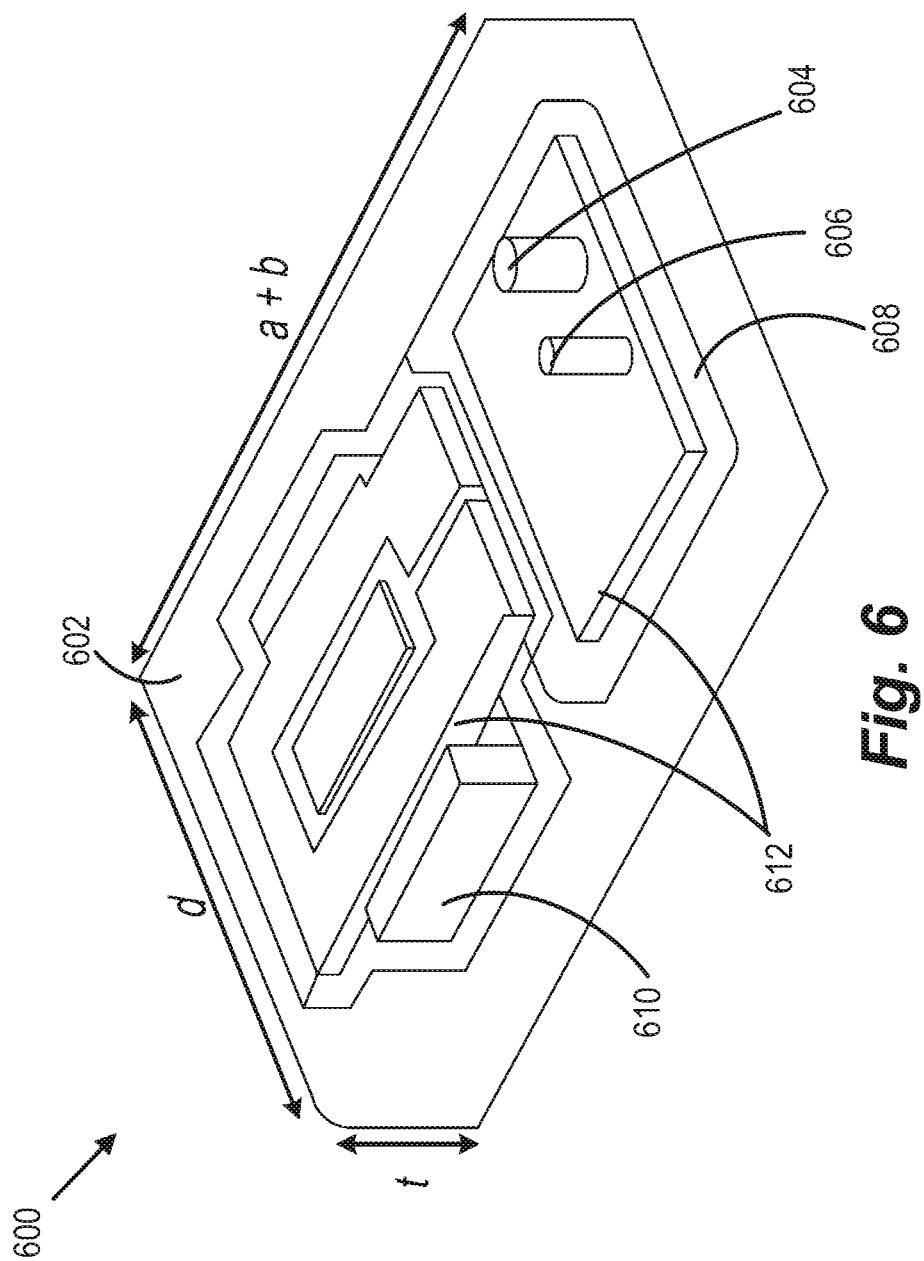
FIG. 6 is an exemplary illustration of a half circuit assembly of a power conversion circuit.

FIG. 6 is an exemplary illustration of a half-circuit assembly 600 of a power conversion circuit, such as the primary circuit assembly 400 or the secondary circuit assembly 402. The illustration of the half-circuit assembly 600 shows a lower surface 602 of the half-circuit assembly that faces a lower surface 602 of another half-circuit assembly 600 when two half-circuit assemblies 600 are connected to form the power conversion circuit. For example, the lower surface 506 of the primary circuit assembly 400 faces the lower surface 508 of the secondary circuit assembly 402 when the primary circuit assembly 400 is connected to the secondary circuit assembly 402. The half-circuit assembly 600 can include a primary electrical connector 604 and a secondary electrical connector 606 that form the electrical connections with another half-circuit assembly 600. The half-circuit assembly 600 also includes electrical components 608, magnetic core 610, and PCB 612. In addition, the half-circuit assembly 600 can have a height t equal to a thickness of the PCB 612 plus a thickness of the electrical components 608 or the magnetic core 610. The half-circuit assembly 600 can also have a length that corresponds to a total length of the PCB 612 or a length a of the electrical components 608 plus a length b of the magnetic core 610.

Figure 7:
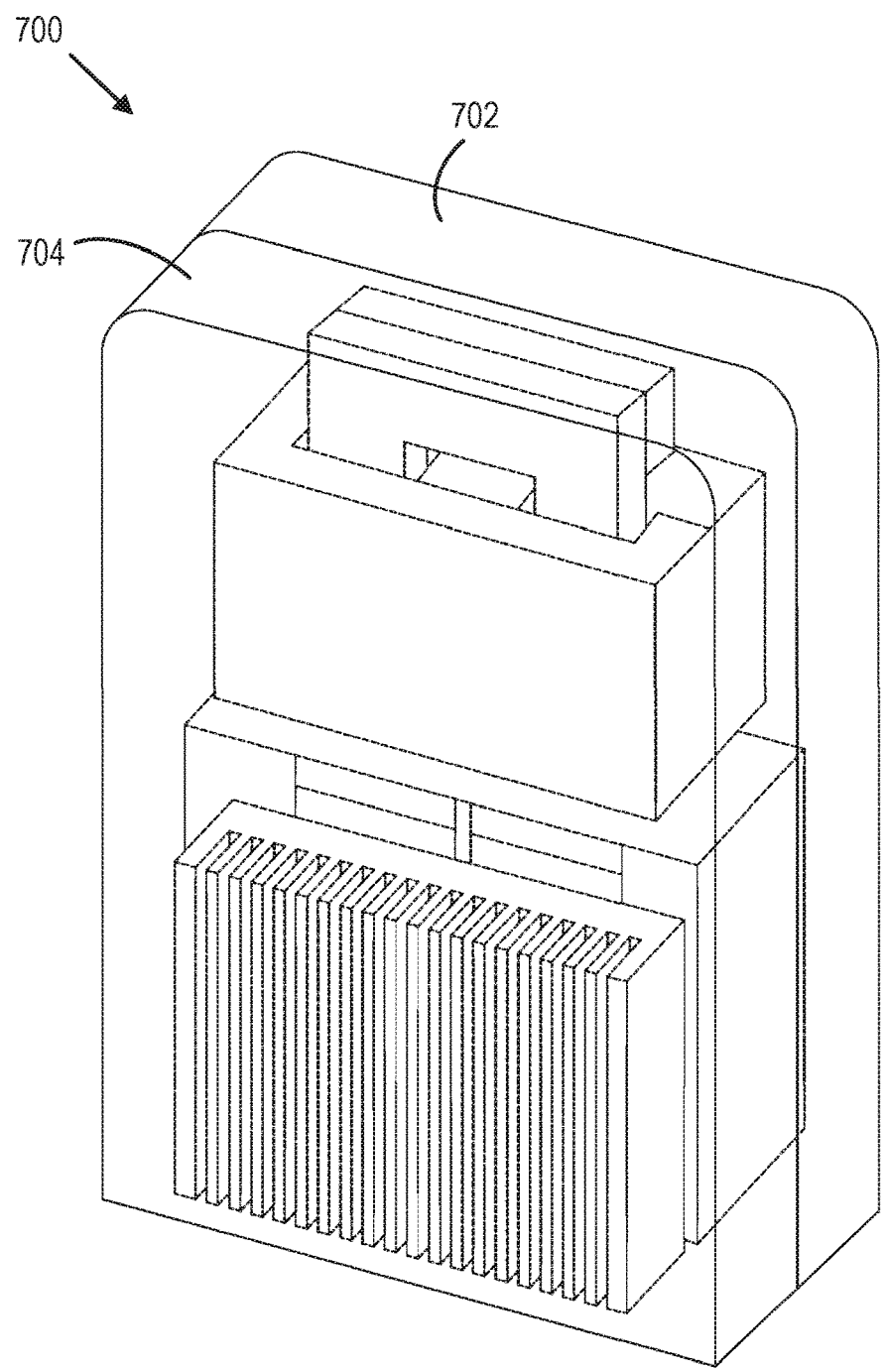
FIG. 7 is an exemplary illustration of connected half-circuit assemblies.

FIG. 7 is an exemplary illustration of connected half-circuit assemblies 700 that form a power conversion circuit, such as the DC-DC power conversion circuit 100. For example, half-circuit assembly 702 can be connected to half-circuit assembly 704 to form the power conversion circuit via at least one electrical connection or magnetic coupling between magnetic cores installed within the half-circuit assemblies. In one implementation, the half-circuit assembly 702 corresponds to the primary circuit assembly 400, and the half-circuit assembly 704 corresponds to the secondary circuit assembly 402. References to the half-circuit assemblies 400 and 402 and the half-circuit assemblies 702 and 704 can be used interchangeably throughout the disclosure. The connected half-circuit assemblies 702 and 704 may not have the wasted space that is present in the conventional circuit packaging assembly 130, which can result in reduced circuit volume and increased power density. For example, when the primary circuit assembly 400 is connected to the secondary circuit assembly 402 that has an identical configuration and structure to the primary circuit assembly 400, the circuit volume can be approximately 12 cc, and the power density can be approximately 33 W/cc, which is greater than the 10-15 W/cc power density for the conventional circuit packaging assembly 130. Also, the volume of the connected half-circuit assemblies 702 and 704 is approximately 3.3 times smaller than the volume of the conventional circuit packaging assembly 130 with a similar power rating.

Figure 8A:
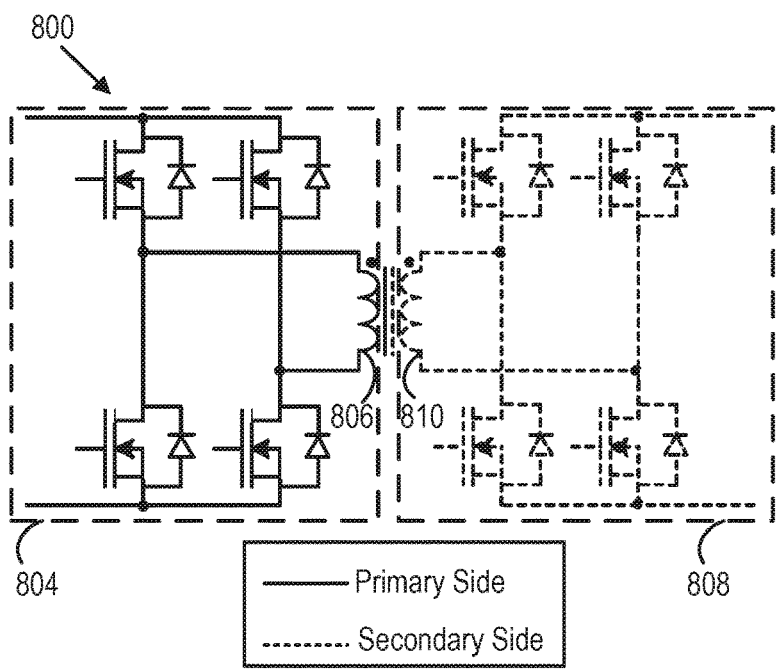
FIG. 8A is an exemplary schematic diagram of a power conversion circuit.
Figure 8B:
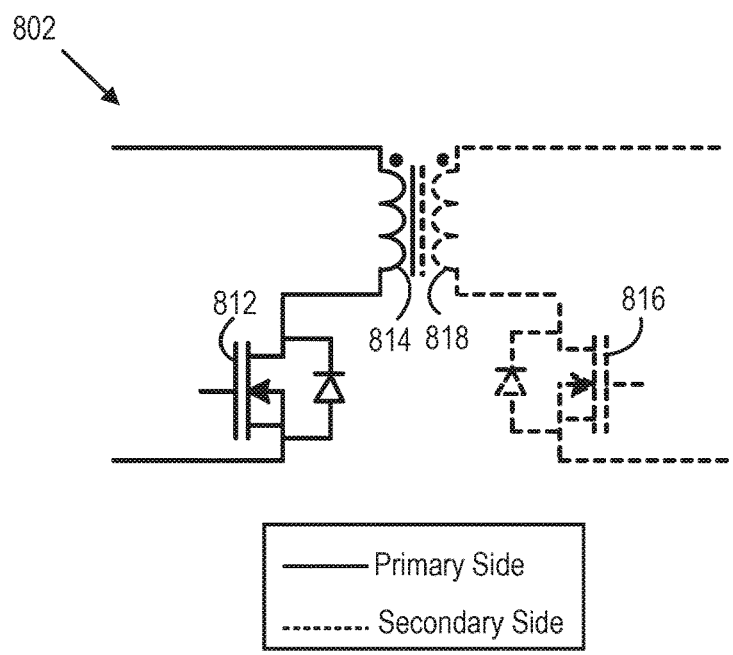
FIG. 8B is an exemplary schematic diagram of a power conversion circuit.
Figure 8C:
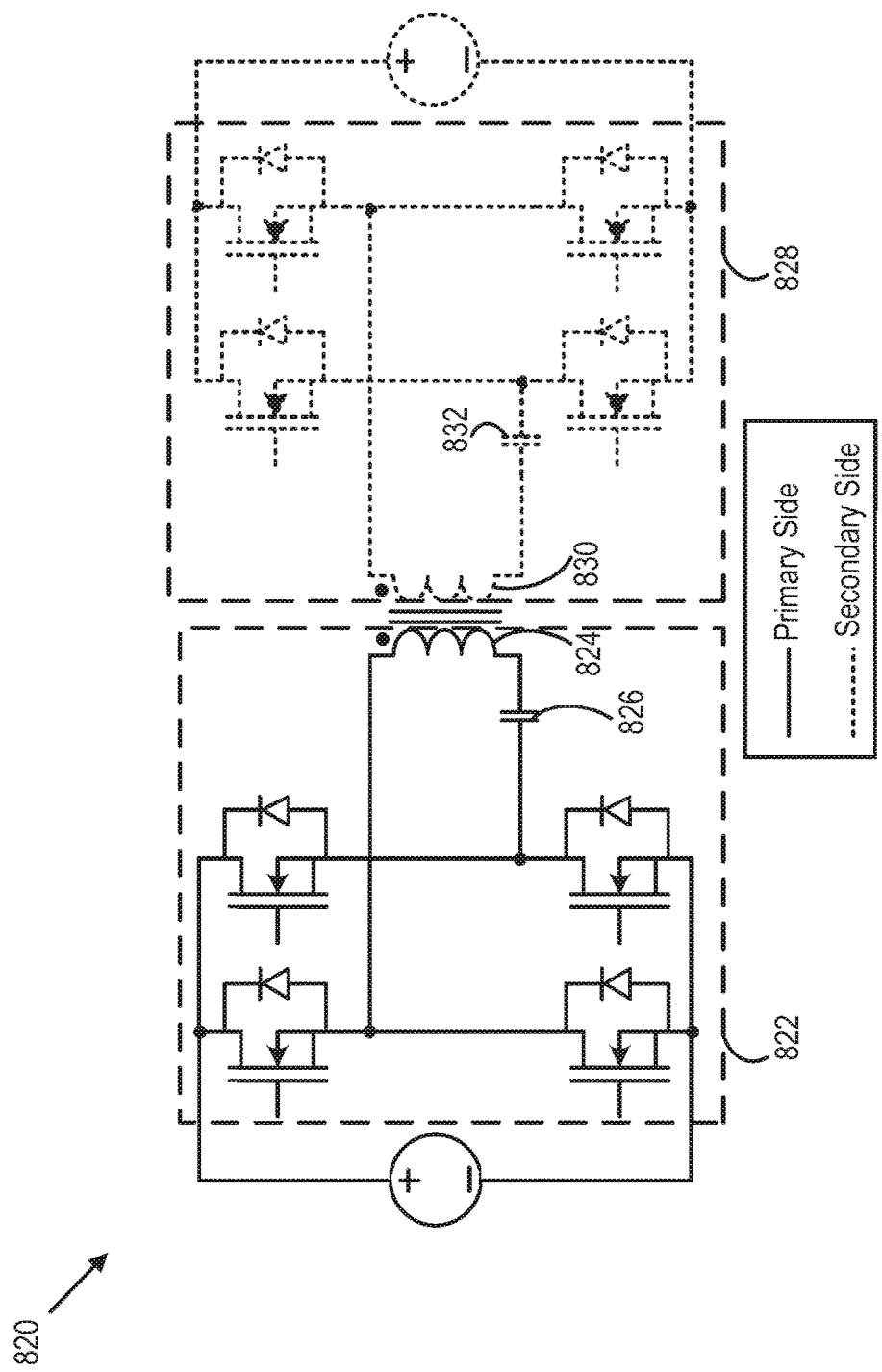
FIG. 8C is an exemplary schematic diagram of a power conversion circuit.

The implementations described herein can also be applied to types of power conversion circuits other than the DC-DC power conversion circuit 100 that have symmetric structures on the primary and secondary sides of the power conversion circuits. FIGS. 8A, 8B, and 8C are schematic diagrams of power conversion circuits 800, 802, and 820 that have symmetrical primary and secondary sides that can be packaged as half-circuit assemblies as previously described. For example, the power conversion circuit 800 in FIG. 8A is a dual-active-bridge (DAB) converter circuit that includes a set of primary switches 804 and a magnetic core 806 on the primary side and a set of secondary set of switches 808 and a magnetic core 810 on a secondary side of the power conversion circuit 800. In addition, the power conversion circuit 802 in FIG. 8B is a flyback converter that includes a primary switch 812 and a magnetic core 814 on a primary side and a secondary switch 816 and a magnetic core 818 on a secondary side of the power conversion circuit 802. The power conversion circuit 820 in FIG. 8C is a LLC converter that includes a set of primary switches 822, a magnetic core 824, and a capacitor 826 on a primary side of the power conversion 820 and a set of secondary switches 828, magnetic core 830, and capacitor 832 on a secondary side of the power conversion circuit 820. Because of the symmetrical structure between the primary and secondary sides, the power conversion circuits 800, 802, and 820 can be constructed from two identical half-circuit assemblies. For example, one half-circuit assembly can be connected to another half-circuit assembly via at least one electrical connection or a magnetic connection to form the power conversion circuit 800, 802, or 820.

Figure 9:
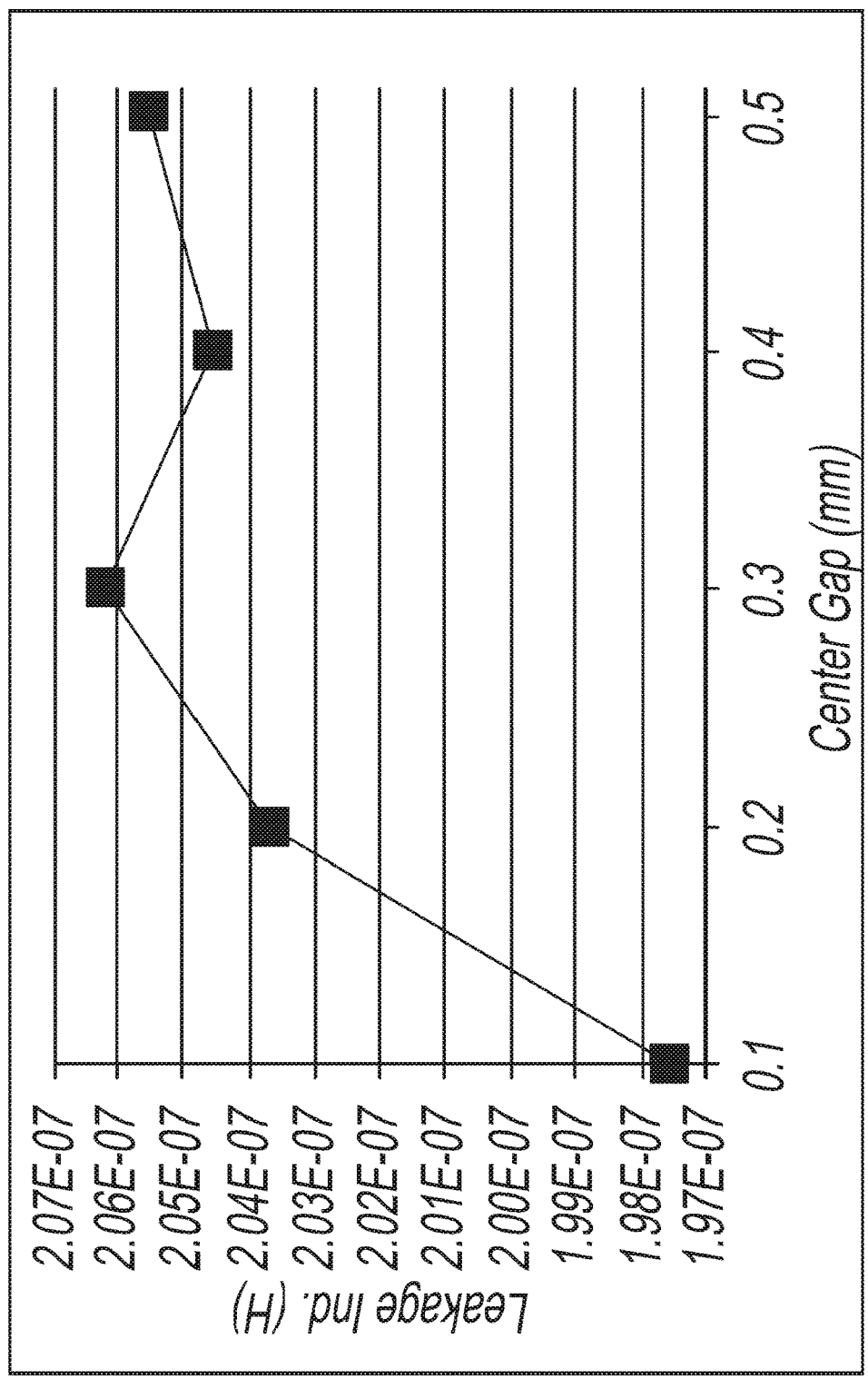
FIG. 9 is an exemplary graph of leakage inductance versus magnetic core gap distance.
Figure 10:
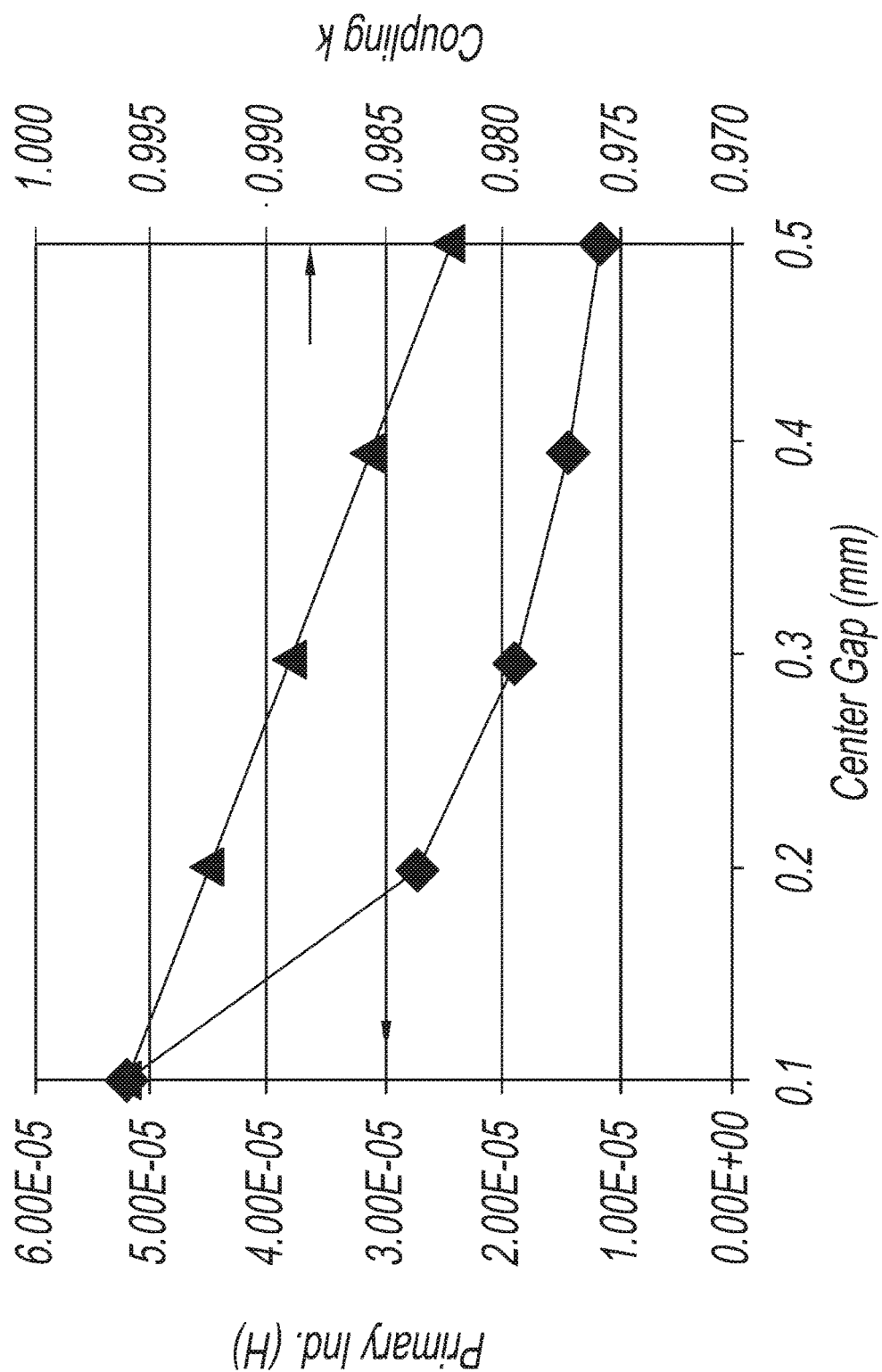
FIG. 10 is an exemplary graph of magnetizing inductance and coupling coefficient versus magnetic core gap distance.

FIGS. 9 and 10 are exemplary graphs of leakage inductance characteristics and magnetic coupling characteristics of magnetic cores of the DC-DC power conversion circuit 100 as a function of a gap distance between the magnetic cores 302a and 304a of the primary circuit assembly 400 and the secondary circuit assembly 402. In some implementations, the magnetic coupling and leakage inductance properties of the DC-DC power conversion circuit 100 can be modified by increasing or decreasing the gap distance between the primary circuit assembly 400 and the secondary circuit assembly 402. Having the ability to modify the properties of the DC-DC power conversion circuit 100 provides increased flexibility to implement the connected primary circuit assembly 400 and the secondary circuit assembly 402 in various power conversion application that have multiple power and voltage characteristics.

For example, FIG. 9 is an exemplary graph of leakage inductance versus magnetic core gap distance. The leakage inductance values shown in the graph can correspond to the combined inductance of the leakage inductors 123 and 124 of the DC-DC power conversion circuit 120. In some implementations, decreasing the leakage inductance for the magnetic cores 302a and 304a improves the performance a power conversion circuit. However, the leakage inductance of the magnetic cores 302a 304a is used in the DC-DC power conversion circuit 100 to transfer power via the cross-connected capacitors 102 and 104, which can be referred to as capacitive power transfer. The graph includes data points for magnetic core gap distances of 0.1, 0.2, 0.3, 0.4, and 0.5 millimeters (mm). FIG. 10 is an exemplary graph of magnetizing inductance and coupling coefficient versus magnetic core gap distance, and the graph includes data points for magnetic core gap distances of 0.1, 0.2, 0.3, 0.4, and 0.5 mm. In some implementations, both the primary inductance and the coupling coefficient for the magnetic cores 302a and 304a decreases as the gap distance between the magnetic cores 302a and 304a increases.

Figure 11A:
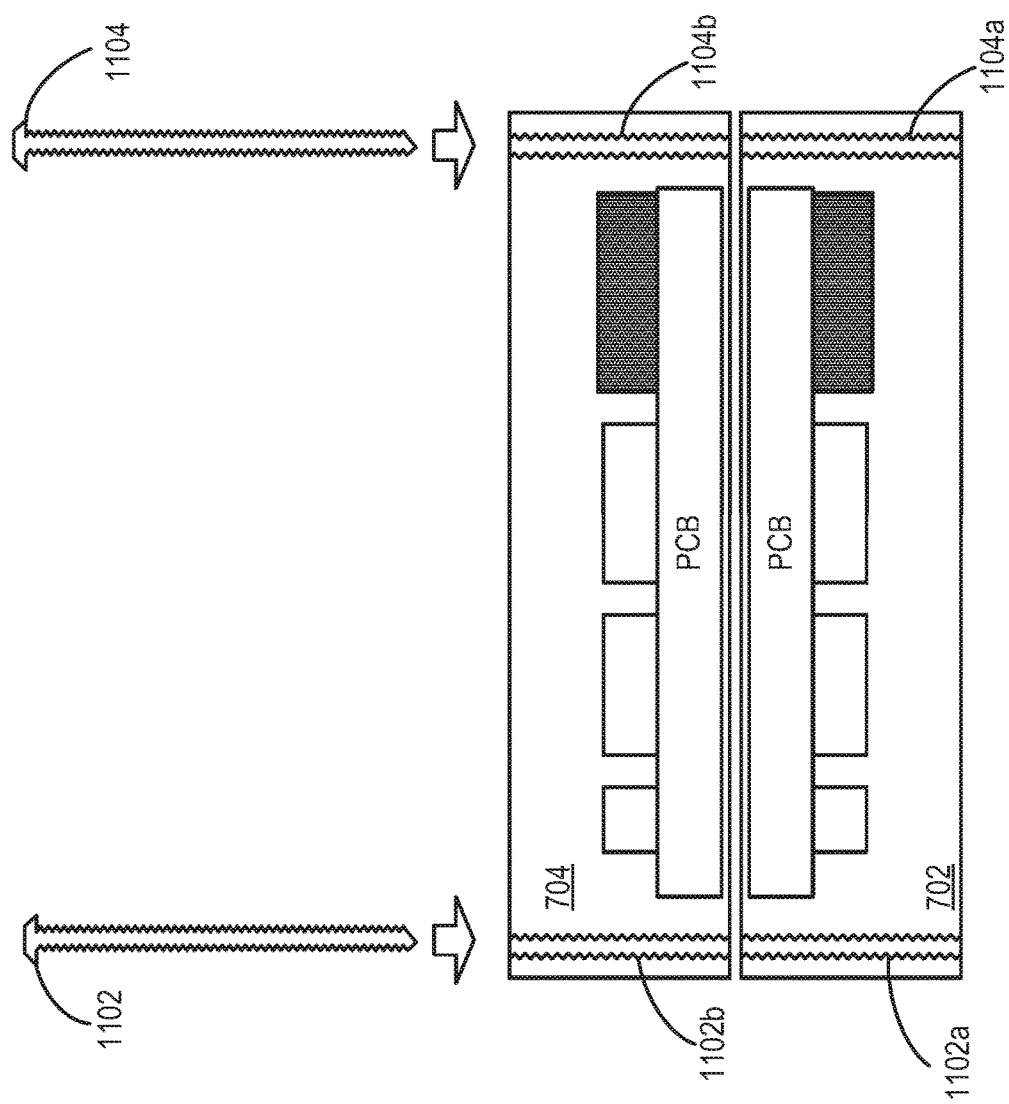
FIG. 11A is an exemplary side view of half-circuit assemblies.
Figure 11B:
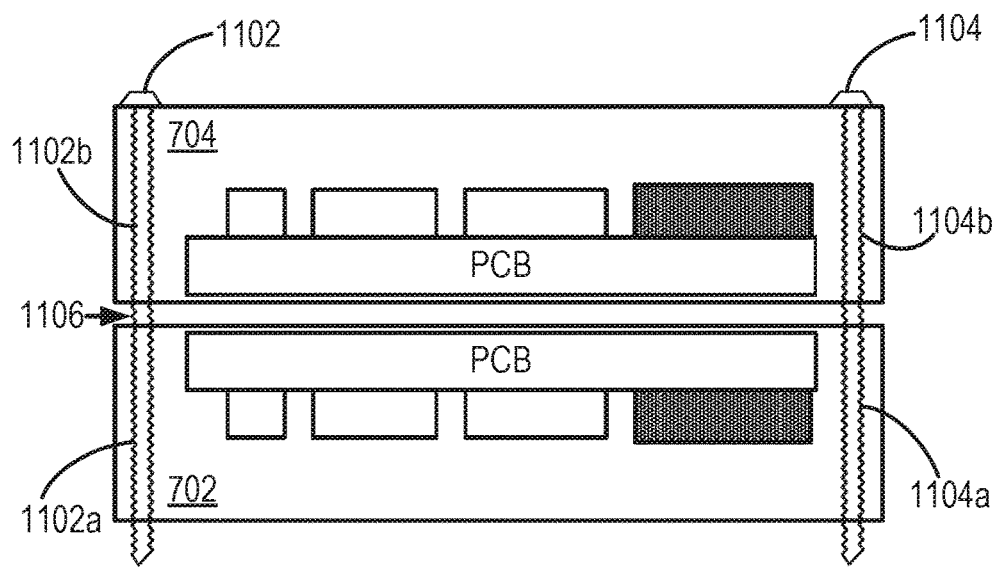
FIG. 11B is an exemplary side view of connected half-circuit assemblies.
Figure 11C:
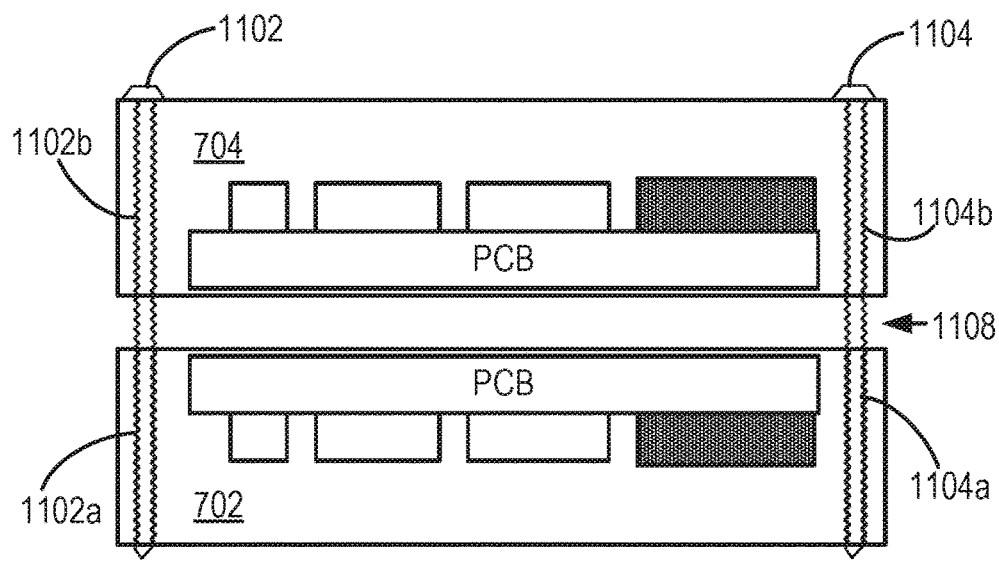
FIG. 11C is an exemplary side view of connected half-circuit assemblies.

FIGS. 11A-11C are exemplary side views of half-circuit assemblies 702 and 704 that can be mechanically connected via one or more screws. For example, FIG. 11A includes the half-circuit assembly 702 with screw holes 1102a and 1104a and the half-circuit assembly 704 with screw holes 1102b and 1104b. In addition to the magnetic and electrical connections discussed previously, the primary half-circuit assembly 702 can be mechanically connected to the secondary half-circuit assembly 704 in order to maintain the predetermined gap distance between the half-circuit assemblies 702 and 704 based on the predetermined leakage inductance and magnetic coupling properties of the magnetic cores 302a and 304a. For example, screw 1102 can be inserted into the screw holes 1102a and 1102b, and screw 1104 can be inserted into the screw holes 1104a and 1104b.

In some implementations, the distance between the half-circuit assemblies 702 and 704 corresponds to a number of screw pitches between the half-circuit assemblies 702 and 704. For example, FIG. 11B shows the screw 1102 inserted into the screw holes 1102a and 1102b and screw 1104 inserted into the screw holes 1104a and 1104b with two screw pitches 1106 between the half-circuit assemblies 702 and 704. The number of screw pitches between the half-circuit assemblies 702 and 704 can be increased or decreased to modify the transformer properties of the magnetic cores 302a and 304a, which can include the leakage inductance and magnetic coupling properties. For example, to decrease the coupling coefficient, the distance between the half-circuit assemblies 702 and 704 can be increased. FIG. 11C illustrates an exemplary implementation where the number of screw pitches 1108 between the half-circuit assemblies 702 and 704 can be increased to five.

Figure 12:
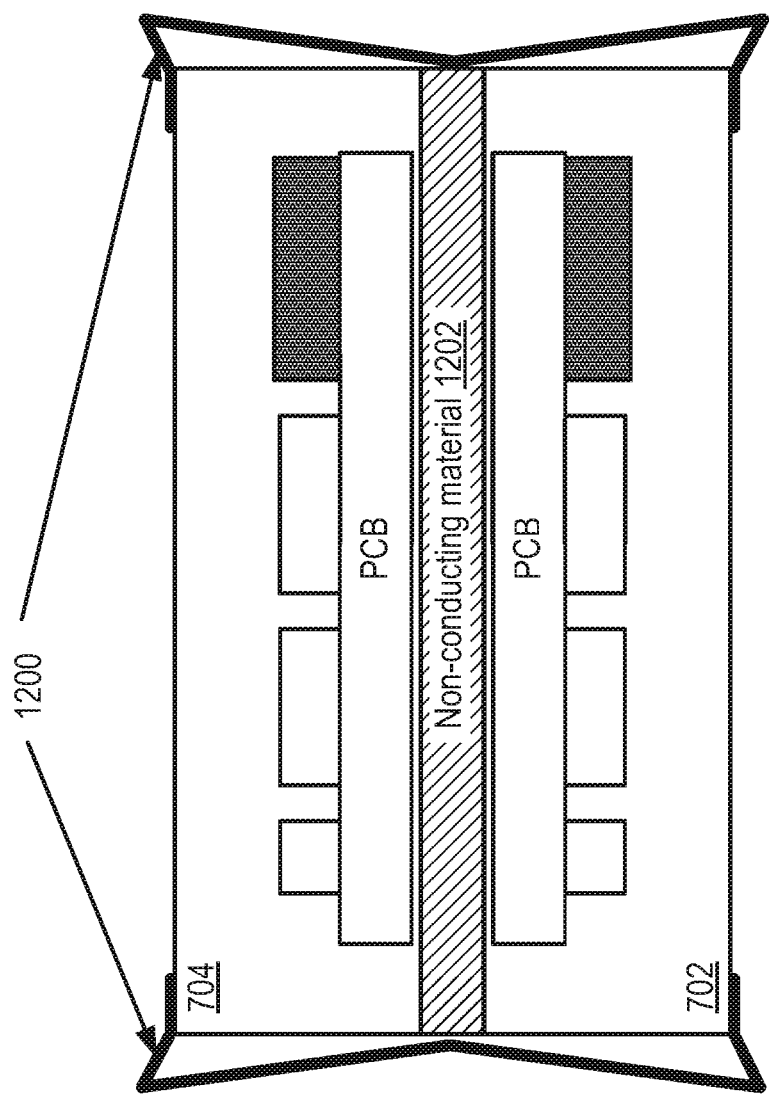
FIG. 12 is an exemplary side view of connected half-circuit assemblies.

Other types of mechanical connections for the half-circuit assemblies 702 and 704 can also be implemented. For example, FIG. 12 is an exemplary side view of the half-circuit assemblies 702 and 704 that are mechanically connected via one or more clips 1200. To maintain the predetermined gap distance between the half-circuit assemblies 702 and 704, a non-conducting material 1202 can be inserted between the connected half-circuit assemblies 702 and 704. The non-conducting material 1202 can have a thickness that corresponds to the distance between the magnetic cores 302a and 304a of the half-circuit assemblies 702 and 704. To increase or decrease the distance between the half-circuit assemblies 702 and 704, another piece of the non-conducting material 1202 that has an increased or decreased thickness.

Figure 13:
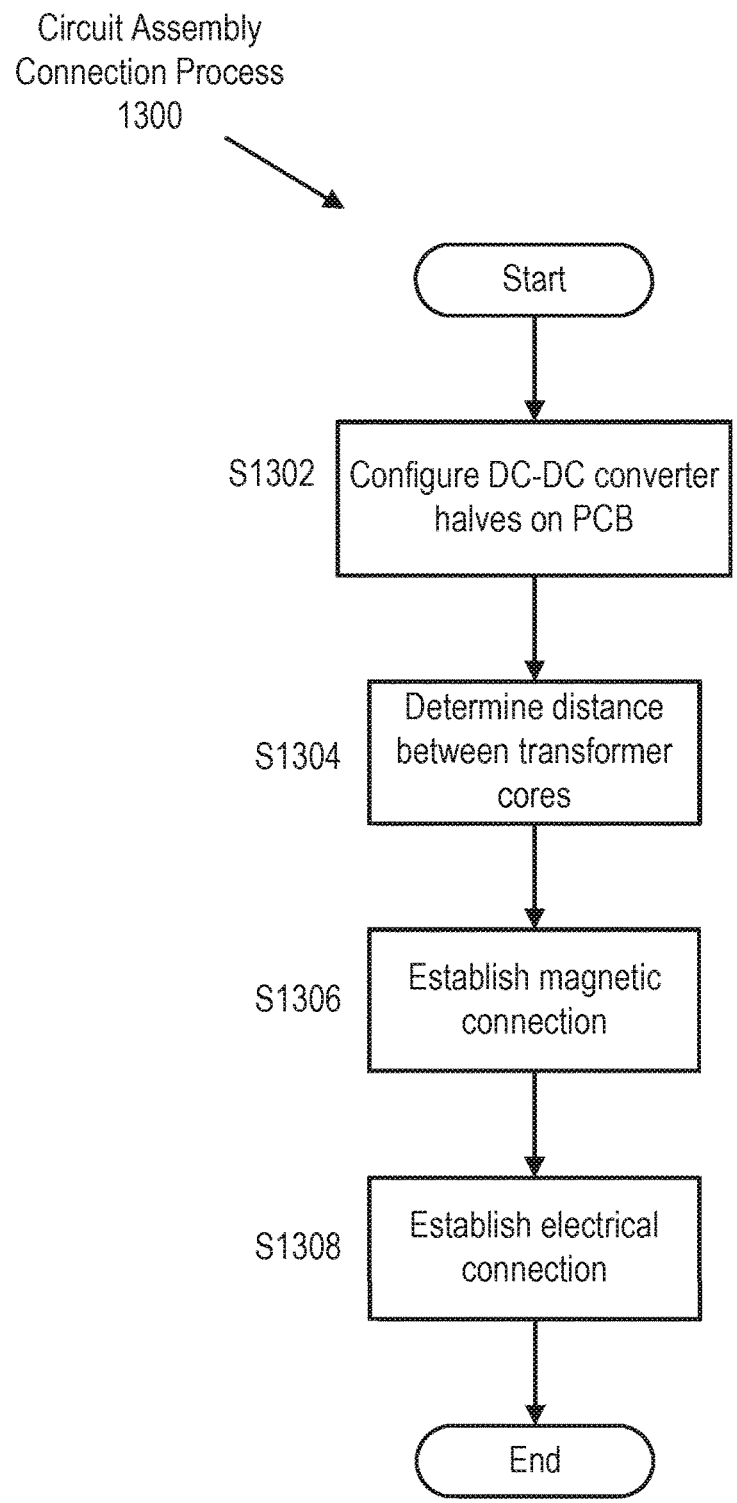
FIG. 13 is an exemplary flowchart of a circuit assembly connection process.

FIG. 13 is an exemplary flowchart of a circuit assembly connection process 1300. In some implementations, the circuit assembly connection process 1300 can be performed upon initial construction and connection of the half circuit assemblies 400 and 402 to form the DC-DC power conversion circuit 100. The circuit assembly connection process 1300 can also be applied to instances where a one of the half-circuit assemblies 400 or 402 is replaced in response to detecting a failed component. The circuit assembly connection process 1300 is described with respect to the half-circuit assemblies 400 and 402 of the DC-DC power conversion circuit 100 but can also be applied to other types of power conversion circuits.

At step S1302, one half of the DC-DC power conversion circuit 100 is configured on at least one PCB. For example, the primary circuit assembly 400 can include primary side electrical components 408 configured on a PCB 410 that include primary side circuitry of the DC-DC power conversion circuit 100 such as the primary switch 106 with the parallel-connected diode, capacitor 102, and other associated components, wiring, and the like. The primary circuit assembly 400 can also include the magnetic core 302a mounted on PCB 412 that corresponds to the magnetic core 302 from the schematic diagram of the DC-DC power conversion circuit 100. In some implementations, the PCB 410 and PCB 412 can be one PCB on which the primary side electrical components 408 and the magnetic core 302a are configured.

The secondary circuit assembly 402 can include secondary side electrical components 414 configured on a PCB 416 that include secondary side circuitry of the DC-DC power conversion circuit 100 such as the secondary switch 108 with the parallel-connected diode, capacitor 104, and other associated components, wiring, and the like. The secondary circuit assembly 402 can also include magnetic core 304a mounted on PCB 418 that corresponds to the magnetic core 304 from the schematic diagram of the DC-DC power conversion circuit 100. In some implementations, the PCB 416 and PCB 418 can be one PCB on which the secondary side electrical components 414 and the magnetic core 304a are configured.

At step S1304, a gap distance between the magnetic cores 302a and 304a is determined. The primary circuit assembly 400 can be connected to the secondary circuit assembly 402 via magnetic coupling that occurs between the magnetic cores 302a and 304a. In some implementations, transformer properties of the DC-DC power conversion circuit 100, such as magnetizing inductance, coupling coefficient, or leakage inductance are based on the gap distance between the magnetic core 302a and the magnetic core 304a. Because the magnetic core 302a and magnetic core 304a are housed in physically distinct circuit assemblies, the transformer properties of the DC-DC power conversion circuit 100 can be modified by increasing or decreasing the distance of a gap between the primary circuit assembly 400 and the secondary circuit assembly 402 as discussed previously with respect to the graphs in FIGS. 9 and 10. Being able to modify the transformer properties can provide greater flexibility to modify operational characteristics of the DC-DC power conversion circuit 100 after the primary circuit assembly 400 and the secondary circuit assembly 402 are constructed. In addition, the mechanical connection between the primary circuit assembly 400 and the secondary circuit assembly 402 can be based on the determined distance. As discussed previously, when the half-circuit assemblies 400 and 402 are connected via screws, a number of screw pitches between the half-circuit assemblies 400 and 402 corresponds to the gap distance. When the half-circuit assemblies 400 and 402 are connected via clips, the gap distance corresponds to a thickness of non-conducting material separating the half-circuit assemblies 400 and 402.

At step S1306, a magnetic connection between the primary circuit assembly 400 and the secondary circuit assembly 402 is established. For example, when the primary circuit assembly 400 is connected to the secondary circuit assembly 402, a lower surface of the PCBs 410 and 412 face a lower surface of the PCBs 416 and 418. The primary circuit assembly 400 can be separated from the secondary circuit assembly 402 by the gap distance determined at step S1304 in order to obtain the predetermined leakage inductance and magnetic coupling properties of the magnetic cores 302a and 304a.

At step S1308, an electrical connection is established between the primary circuit assembly 400 and the secondary circuit assembly 402. For example, the half-circuit assemblies 400 and 402 can include a primary electrical connector 404a and a secondary electrical connector 406a that correspond to the primary electrical connection 404 and the secondary electrical connection 406 in the DC-DC power conversion circuit 100. In some implementations, the primary circuit assembly 400 is connected to the secondary circuit assembly 402 by connecting the primary electrical connector 404a from the primary circuit assembly 400 to the primary electrical connector 404a from the secondary circuit assembly 402 and connecting the secondary electrical connector 406a from the primary circuit assembly 400 to the secondary electrical connector 406a from the secondary circuit assembly 402.

In instances where at least one failed component is detected in the primary circuit assembly 400 or the secondary circuit assembly 402, the primary electrical connectors 404a and the secondary electrical connectors 406a on the primary circuit assembly 400 and the secondary circuit assembly 402 can be disconnected, and either the primary circuit assembly 400 or the secondary circuit assembly 402 is replaced without having to replace a circuit packaging assembly that includes an entire power conversion circuit. The steps S1304, S1306, and S1308 can be performed to replace the half-circuit assembly 400 or 402 with the failed component.

Aspects of the present disclosure are directed to constructing and connecting half-circuit assemblies of symmetric power conversion circuits to provide greater design flexibility due to the modifiable magnetic coupling and leakage inductance properties. The implementations described herein also result in lower manufacturing costs. Also, the reduced complexity of the half-circuit assemblies and because using identical half-circuit assemblies for each half of the DC-DC power conversion circuit 100 can result in mass production of the half-circuit assemblies. In addition, when a failed component is detected, only one of the half-circuit assemblies may have to be replaced. Also, the connected half-circuit assemblies 400 and 402 of the DC-DC power conversion circuit 100 may not have the wasted space that is present in the conventional circuit packaging assemblies, which can result in reduced circuit volume and increased power density.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Accordingly, other implementations are within the scope that may be claimed.

The invention claimed is:

1. A device comprising:
   a first circuit assembly including
      first circuitry configured on a first upper surface of a first circuit board including a first side of power conversion circuit, and
      a first magnetic core configured on the first upper surface of the first circuit board; and
   a second circuit assembly including
      second circuitry configured on a second upper surface of a second circuit board including a second side of the power conversion circuit, and
      a second magnetic core configured on the second upper surface of the second circuit board, wherein
   the first circuitry of the first circuit assembly is connected to the second circuitry of the second circuit assembly to form the power conversion circuit via at least one of an electrical connection or a magnetic coupling between the first magnetic core and the second magnetic core,
   wherein the first and second circuit boards are of equal length.

2. The device of claim 1, wherein the first circuit assembly and the second circuit assembly have corresponding structures and configurations.

3. The device of claim 1, wherein a first lower surface of the first circuit assembly faces a second lower surface of the second circuit assembly when the first circuitry of the first circuit assembly is connected to the second circuitry of the second circuit assembly.

4. The device of claim 1, wherein a total length of the device corresponds to the first length of the first circuit board or the second length of the second circuit board.

5. The device of claim 4, wherein the first length of the first circuit board is equal to a second length of the second circuit board.

6. The device of claim 1, wherein
   a first height of the first circuit assembly corresponds to a first thickness of the first circuit board plus a second thickness of the first circuitry or the first magnetic core configured on the first upper surface of the first circuit board;
   a second height of the second circuit assembly corresponds to a third thickness of the second circuit board plus a fourth thickness of the second circuitry and second first magnetic core configured on the second upper surface of the second circuit board; and
   the total height of the device corresponds to the first height of the first circuit assembly plus the second height of the second circuit assembly plus a predetermined distance between the first magnetic core and the second magnetic core.

7. The device of claim 6, wherein the first height of the first circuit assembly is equal to the second height of the second circuit assembly.

8. The device of claim 1, wherein the first circuitry includes a first switch and a first capacitor, and the second circuitry includes a second switch and a second capacitor.

9. The device of claim 8, wherein the first circuitry is electrically connected to the second circuitry via the first capacitor and the second capacitor cross-connected across the first magnetic core and the second magnetic core.

10. The device of claim 1, wherein the first circuitry and the second circuitry are symmetric across the first magnetic core and the second magnetic core.

11. The device of claim 1, wherein the power conversion circuit is configured to perform bi-directional power transfer.

12. The device of claim 1, wherein a distance between the first magnetic core and the second magnetic core when the first circuitry is connected to the second circuitry is based on one or more predetermined coupling characteristics of the power conversion circuit.

13. The device of claim 12, wherein the one or more predetermined coupling characteristics include an amount of magnetizing inductance or a coupling coefficient.

14. The device of claim 1, wherein a distance between the first magnetic core and the second magnetic core when the first circuitry is connected to the second circuitry is based on a predetermined amount of leakage inductance of the power conversion circuit.

15. The device of claim 1, wherein the first circuit assembly is mechanically connected to the second circuit assembly via one or more screws where a number of screw pitches between the first circuit assembly and the second circuit assembly corresponds to a gap distance between the first magnetic core and the second magnetic core.

16. The device of claim 1, wherein the first circuit assembly is mechanically connected to the second circuit assembly via one or more clips with a non-conducting material between the first circuit assembly and the second circuit assembly having a thickness that corresponds to a gap distance between the first magnetic core and the second magnetic core.

17. A method comprising:
configuring first circuitry including a first side of power conversion circuit and a first magnetic core on a first circuit board to form a first circuit assembly;
configuring second circuitry including a second side of the power conversion circuit and a second magnetic core on a second circuit board to form a second circuit assembly;
establishing a magnetic connection between the first circuitry of the first circuit assembly and the second circuitry of the second circuit assembly based on a predetermined distance between the first magnetic core and the second magnetic core; and
establishing an electrical connection between the first circuitry of the first circuit assembly and the second circuitry of the second circuit assembly via at least one electrical connection,
wherein the first circuit board and the second circuit board are of equal length.

18. The method of claim 17, further comprising:
modifying at least one of an amount of magnetic coupling or an amount of leakage inductance between the first magnetic core and the second magnetic core by modifying the distance between the first circuit assembly and the second circuit assembly.

19. The method of claim 17, further comprising:
detecting at least one failed component of the power conversion circuit;
disconnecting the first circuitry of the first circuit assembly from the second circuitry of the second circuit assembly; and
replacing the first circuit assembly or the second circuit assembly based on a location of the at least one failed component.

20. A circuit assembly comprising:
circuitry configured on an upper surface of a circuit board including a half of a power conversion circuit; and
a magnetic core configured on the upper surface of the circuit board, wherein
the circuitry is configured to connect to the circuitry of another circuit assembly to form the power conversion circuit via at least one of an electrical connection or a magnetic coupling between the magnetic core and another magnetic core of the another circuit assembly,
wherein the circuit board and a circuit board of the other circuit assembly are of equal length.

* * * * *